ized the AC current of the solar cell at an applied DC voltage at the position on the solar cell where the cell is illuminated and a feedback scheme which permits the direct scanning measurements of the open circuit voltage. The accuracy of the measurement is a function of the intensity and wavelength of the laser light with respect to the intensity and wavelength distribution of sunlight and the percentage the dark current is at the open circuit voltage to the short circuit current of the solar cell.

United States Patent [19]

Staebler

[11] 4,205,265
[45] May 27, 1980

[54] LASER BEAM APPARATUS AND METHOD FOR ANALYZING SOLAR CELLS

[75] Inventor: David L. Staebler, Lawrenceville, N.J.

[73] Assignee: RCA Corporation, New York, N.Y.

[21] Appl. No.: 935,302

[22] Filed: Aug. 21, 1978

[51] Int. Cl.² .............................................. G01R 27/14
[52] U.S. Cl. .................................... 324/158 D; 324/64
[58] Field of Search .............. 324/158 R, 158 D, 62, 324/64, 20 R, 22–25, 29.5, 30 R; 358/199

[56] References Cited

U.S. PATENT DOCUMENTS

| | | | |
|---|---|---|---|
| 3,549,999 | 12/1970 | Norton | 324/158 D |
| 3,745,454 | 7/1973 | Nikirk | 324/158 D |
| 4,051,437 | 9/1977 | Lile | 324/158 R |
| 4,084,188 | 4/1978 | Gorog | 358/199 |
| 4,122,383 | 10/1978 | Frosch | 324/20 R |
| 4,129,823 | 12/1978 | van der Pool | 324/20 R |

Primary Examiner—Michael J. Tokar
Attorney, Agent, or Firm—Birgit E. Morris; A. Stephen Zavell

[57] ABSTRACT

A laser beam apparatus and method for analyzing, inter alia, the current versus voltage curve at the point of illumination on a solar cell and the open circuit voltage of a solar cell. The apparatus incorporates a lock-in amplifier, and a laser beam light chopper which permits the measurement of the AC current of the solar cell at an applied DC voltage at the position on the solar cell where the cell is illuminated and a feedback scheme which permits the direct scanning measurements of the open circuit voltage. The accuracy of the measurement is a function of the intensity and wavelength of the laser light with respect to the intensity and wavelength distribution of sunlight and the percentage the dark current is at the open circuit voltage to the short circuit current of the solar cell.

15 Claims, 6 Drawing Figures $V_{OC}$ SCAN $I_{sc}$ SCAN

LASER BEAM APPARATUS AND METHOD FOR ANALYZING SOLAR CELLS

The invention described herein was made during the performance of work under an Energy Research And Development Adminstration Contract, (ERDA), presently the Department Of Energy, No. EY-76-C-03-1286.

BACKGROUND OF THE INVENTION

This invention relates to a method and an apparatus for measuring electronic parameters of a solar cell. More specifically, this invention relates to an apparatus and a method for analyzing the short circuit current, $I_{sc}$, the open circuit voltage, $V_{oc}$, and plotting the IV curve of a solar cell.

As solar technology moves out of the laboratory and into full scale production and the solar cells increase in size, a method and apparatus is needed to measure the electronic parameters of a solar cell quickly and efficiently. In the past, a laser beam has been coupled with a kinescope to analyze semiconductor devices as taught by Williams et al, RCA Corporate Engineering Services, pp. 76–78 (1973), Sawyer et al, Solid State Technology, Vol. 30, No. 6, pp. 37–41 and 48 (June 1977), and Sawyer, Proceedings Of The Photovoltaics Program Semi-Annual Review, pp. 708–713, (1977).

The above techniques, although useful for analyzing integrated circuits, and the short circuit current of solar cells, are not useful for finding nonuniformities in $V_{oc}$ or the IV curve of solar cells.

Oroshnik et al, Sol. St. Elect., Vol. 1, pp. 46–53, Pergamon Press, (1960), teaches a method and apparatus which quantitatively estimates the resistivity changes of a semiconductor and permits the plotting of photovoltage versus position on the solar cell. However, the method does not permit the direct measurement of the $V_{oc}$ of a solar cell.

Chandler, Proceedings Of The Southeast Section Of The Institute Of Electrical And Electronic Engineers, Inc., pp. 281–284, April 4–6, 1977, describes a method of measuring the $V_{oc}$ of a cell in various portions of the solar cell. The method requires a top contact with a cross hatched geometry to make the measurements. The top contact requires special processing and provides poor resolution of the open circuit voltage.

Prior to Chandler et al, the only way to measure the $V_{oc}$ of a portion of a solar cell was to break the solar cell into pieces or etch away portions of the metal contacts and measure each section. The measurements resulted in the destruction of the device and therefore was not only time consuming but unrealistic when applied to production operations.

Thus, it would be highly desirable to have an apparatus and a method of measuring the IV curve of a solar cell at any position on the cell, of scanning of the $V_{oc}$ of the solar cell, of plotting the IV curve of the solar cell at a specific point on the cell, and of measuring the $I_{sc}$ of the solar cell.

SUMMARY OF THE INVENTION

My invention is an apparatus and a method for measuring the current versus voltage curve (IV curve) at a position on a solar cell irradiated by a light beam, for plotting the IV curve for a specific point on the solar cell, and for scanning the $V_{oc}$ of the solar cell. The method, in effect, electrically isolates the portions of the solar cell irradiated by the light beam from the rest of the cell and enables the IV curve of that portion of the solar cell to be determined without the removal of that portion of the cell. The light is chopped and the chopped light irradiates the solar cell and creates an AC component of the current. Since ambient light does not affect the AC current, the solar cell measurements can be made in a lighted room. A lock-in amplifier locks in on the AC component of the current of the solar cell while a DC voltage is applied to the cell. The voltage is either fixed, for measuring the IV curve, or determined via a drive amplifier, for scanning the $V_{oc}$.

DETAILED DESCRIPTION OF THE INVENTION

Figure 1:
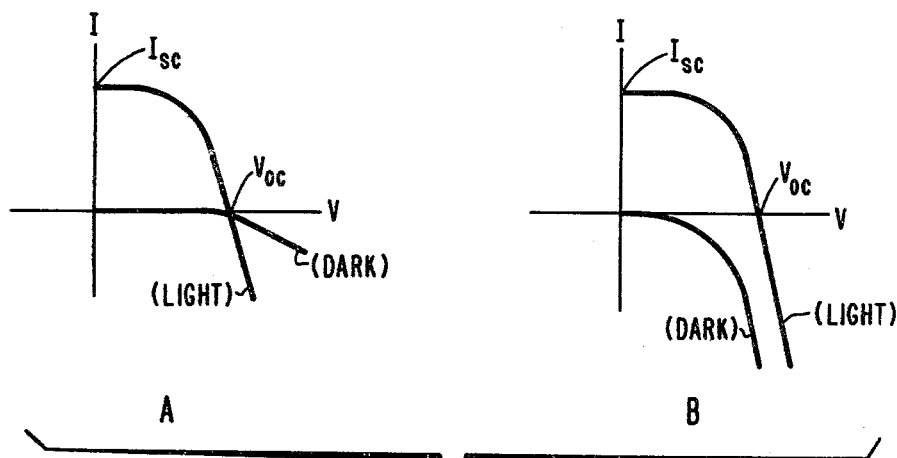
FIG. 1 illustrates a comparison of the necessary current versus voltage curve (IV) of a solar cell material to practice my invention, graph A, and the IV curve of an unsuitable material, graph B.

A semiconductor material with an illuminated and a dark IV curve, which cross, illustrated by graph A in FIG. 1 is required to measure the IV curve at the point of illumination on the solar cell by a light source and to scan the $V_{oc}$ of the material. Amorphous silicon, crystalline $Zn_3P_2$ and like materials are examples of semiconductors which exhibit the IV curve illustrated by graph A. The accuracy of the measured IV curve and the scan of the $V_{oc}$ is dependent upon the percentage that the dark current at the $V_{oc}$ is of the $I_{sc}$ of the solar cell. The IV curve and the scanned $V_{oc}$ cannot be measured, by my method and apparatus, when the IV curves in the light and the dark do not cross, as illustrated in graph B of FIG. 1. Single crystal silicon and single crystal gallium arsenide are examples of semiconductor materials with IV curves similar to graph B, and thus unsuitable for use herein.

To measure the $V_{oc}$ and determine the IV curve at the point of illumination on the solar cell by a light source, the illumating light source, preferably a laser beam, must be chopped, i.e., not continuous while the voltage on the cell is kept constant. Chopping of the light beam creates an AC current equal to the difference between the light and dark curves in FIG. 1. The applied voltage creates a DC current through the entire cell but the AC current is only for that portion of the solar cell which has been illuminated by the light beam. The IV curve of the AC current versus applied DC voltage is therefore equivalent to the IV curve of the DC current versus the DC voltages of the solar cell for applied DC voltage where the DC current from the portion of the cell being tested is zero in the dark. The accuracy of the complete AC current versus DC applied voltage curve with respect to a DC current versus DC voltage curve is determined by the ratio of the DC current in the dark from the portion of the cell being tested to the AC current in the light at a given applied DC voltage. The ratio of dark current to AC current generally increases as the applied voltage approaches $V_{oc}$ as shown in FIG. 1A. The skilled artisan will recognize that this means that the IV curve of the AC current versus the applied DC voltage at the point of illumination deviates from coincidence with the IV curve of the DC current versus applied DC voltage as the applied DC voltage approaches the $V_{oc}$ of the solar cell.

Figure 6:
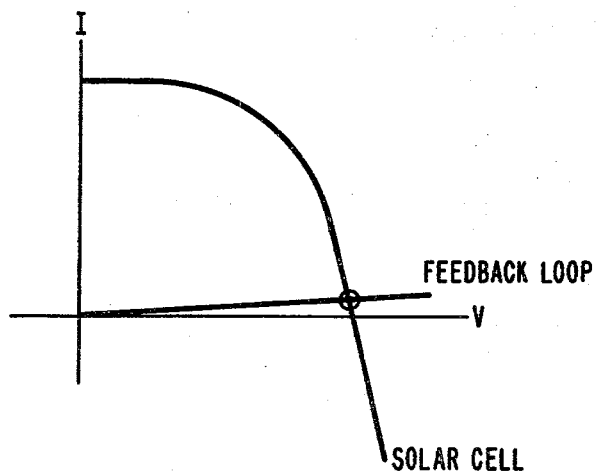
FIG. 6 illustrates a feedback loop scheme to measure the $V_{oc}$.

Scanning the $V_{oc}$ requires a feedback loop to be incorporated into the system to adjust the AC current to zero. The feedback loop senses the AC current and adjusts a DC bias voltage to produce an AC current of zero. Any feedback loop, i.e., analog, digital, etc., which can sense the AC current and adjust to DC voltage to produce an AC current of zero is suitable to practice my invention. The point at which the AC current is zero is the $V_{oc}$ of the cell. A possible scheme for the feedback loop produces a cell bias proportional to the AC current:

$$V = KI_{AC}$$

wherein K is a constant for the feedback loop, $I_{AC}$ is the AC current and V is the applied DC voltage. If K is high enough, V approaches $V_{oc}$, i.e., quasi $V_{oc}$, according to FIG. 6. The skilled artisan will quickly recognize that this $V_{oc}$, or the IV curve, is only an approximation of the true values in sunlight because sunlight covers a whole spectrum of wavelengths while a light source such as a laser contains only one wavelength. The results are similar for power densities where the absorbed laser light and sunlight are equivalent.

Figure 2:
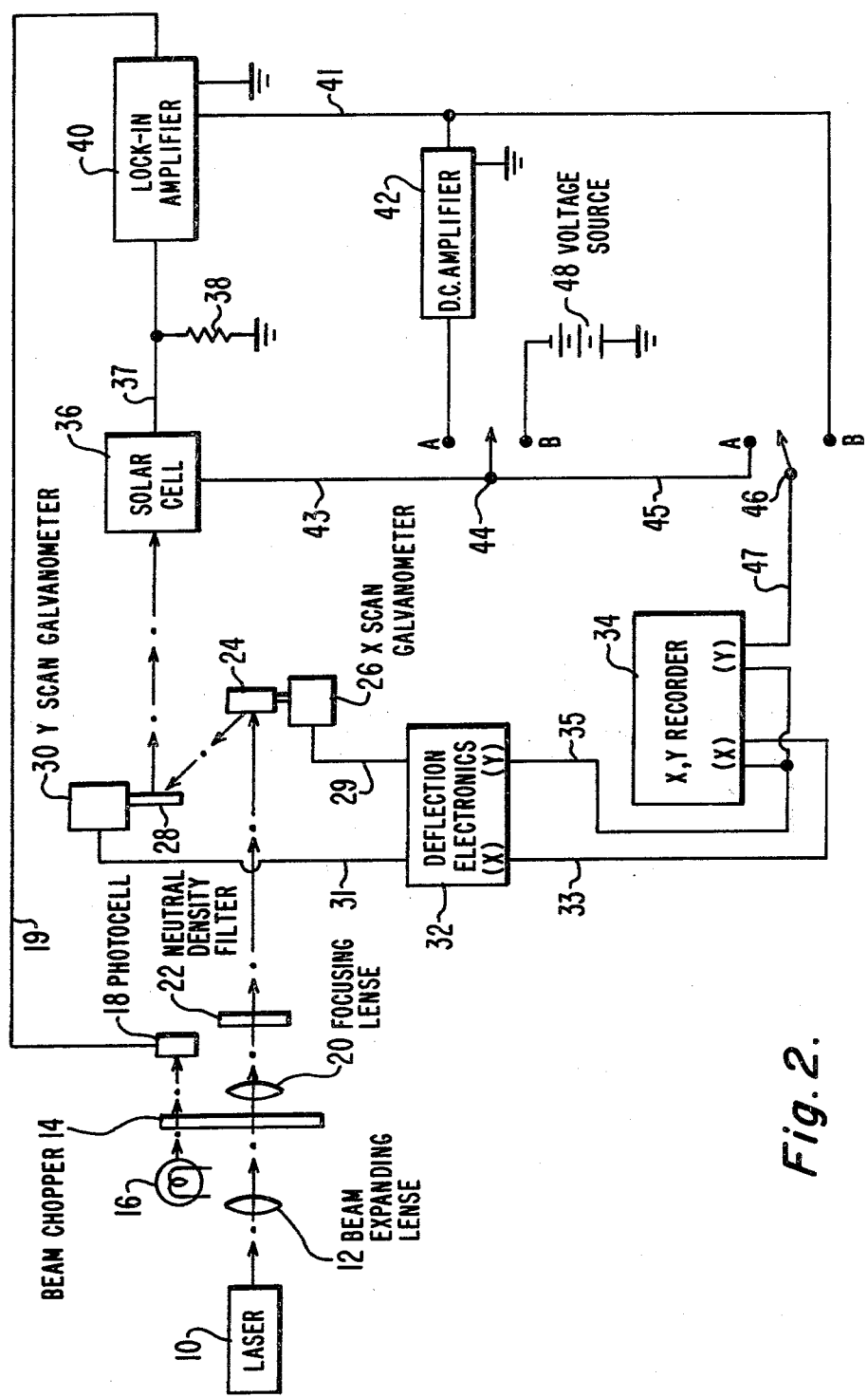
FIG. 2 is a schematic view of an apparatus of my invention.

Having explained the theory behind my invention, the invention will be more clearly illustrated by referring to the schematic diagram in FIG. 2. A light source 10, preferably a coherent light source, i.e., laser, such as a helium neon laser emitting light with a characteristic wavelength of 6,328 angstroms (623.8 nanometers), passes through a beam expander 12 and a light chopper 14 which chops the light beam to a frequency of about 370 hertz. The light source 10 must emit a light of a wavelength at which the solar cell is responsive. The frequency of the chopping is limited only by the response time of the solar cell and the response time of the detection equipment.

A reference light source 16, such as a tungsten bulb, is also chopped by the chopper 14 and the intermittent light is detected by the photocell 18. The chopped light reaching the photocell 18 creates a reference voltage of the same frequency as the light source 10. The frequency of the reference voltage from photocell 18 is transmitted to a lock-in amplifier 40 by a wire 15. Optionally, the chopped light 10 can be passed through a beam splitter (not shown) and part of the split beam can create the reference light at the photocell 18.

After passing through the chopper 14, the light source passes through a focussing lens 20 and a neutral density filter 22. The filter 22 adjusts the power density of the light on the cell to about that of sunlight. The light from the filter 22 is scanned across the solar cell 36 in the horizontal plane, (X direction), by a mirror 24 and in the vertical plane, (Y direction), by a mirror 28 attached to galvonometers 26 and 30 respectively. The current necessary to operate the galvonometers 26 and 30 and to rotate mirrors 24 and 28, is applied by the deflection electronics 32 through two wires 29 and 31. A linear ramp voltage is supplied by wire 29 to the X scan galvonometer while a step voltage is applied to the Y scan galvonometer by wire 31. The vertical and horizontal components of the deflection electronics are also connected to the X and Y terminals of a recorder 34 by two wires 33 and 35 respectively. The voltages plotted by the recorder 34 correspond to the area scanned by the light source 10 on the solar cell 36. A voltage corresponding to the current from the cell is added to the vertical input of the recorder 34. The result is a topological mapping of the cell current versus applied voltage over the cross-section of the cell upon which the light beam impinges.

Figure 3:
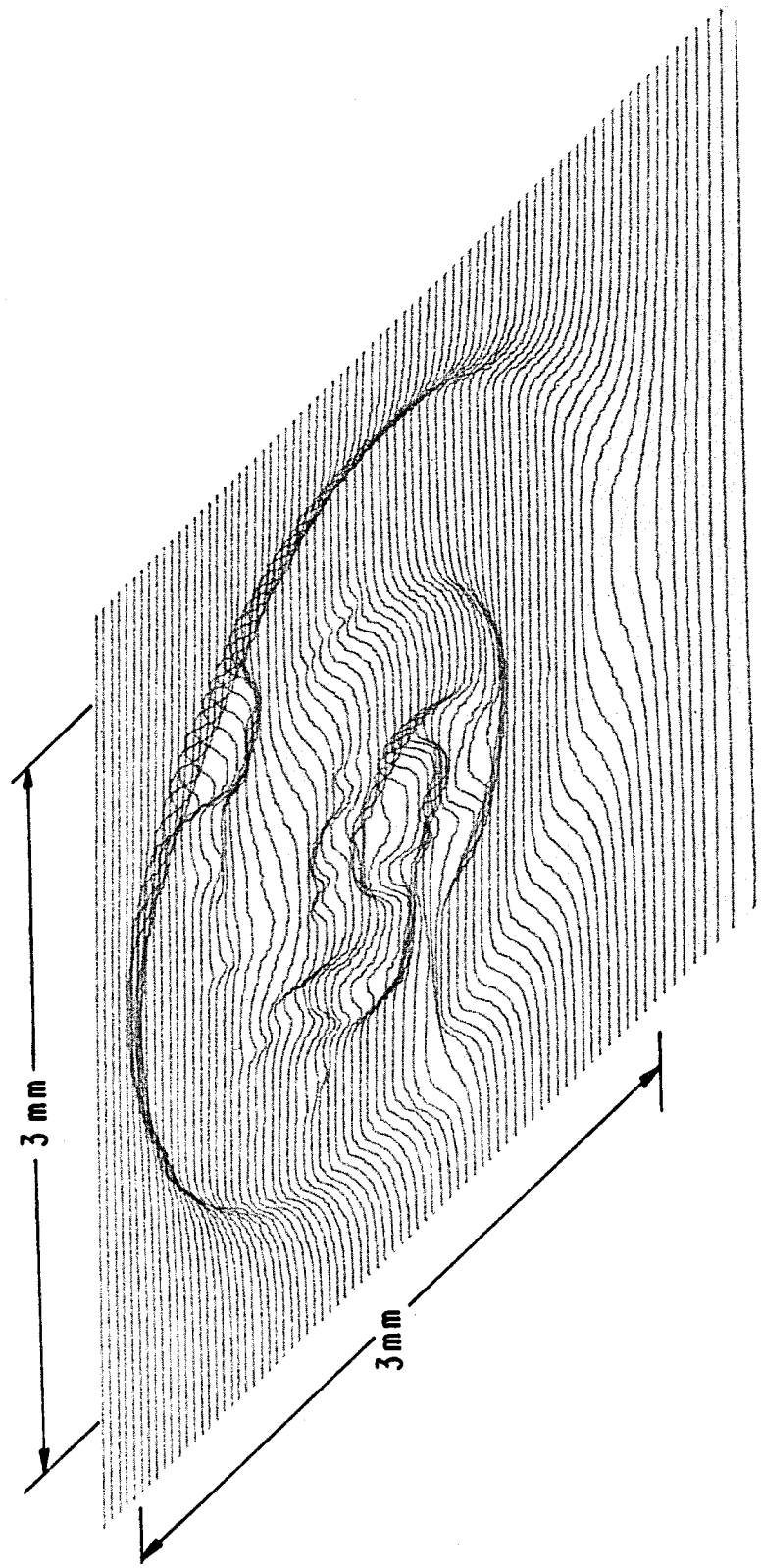
FIG. 3 illustrates a scan of the open circuit voltage of a solar cell.
Figure 4:
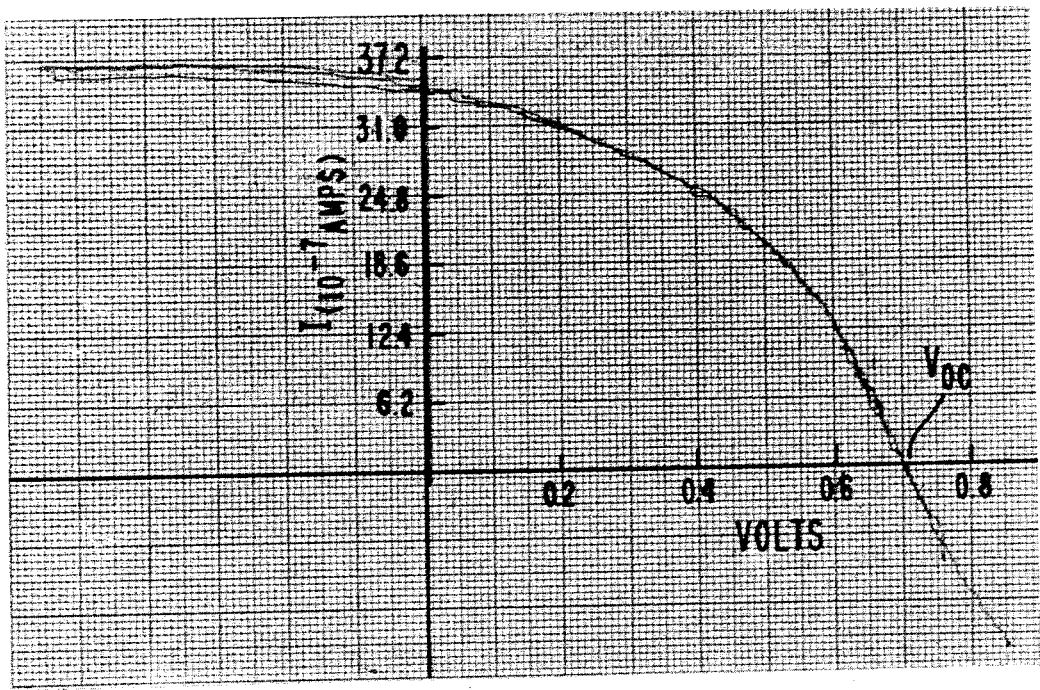
FIG. 4 illustrates two current versus voltage curves of two specific points on a solar cell.
Figure 5:
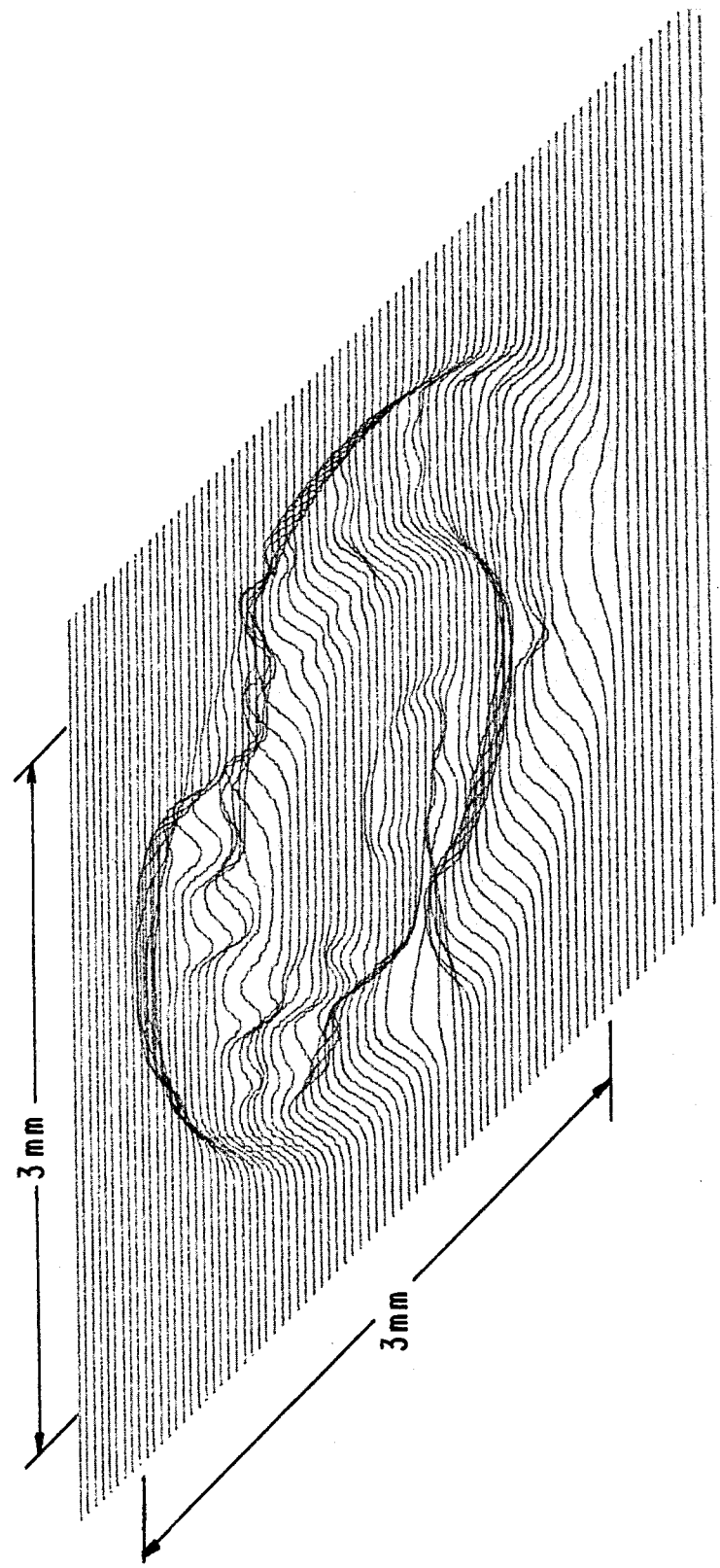
FIG. 5 illustrates a short circuit current versus voltage scan of a solar cell.

Magnification is accomplished by decreasing the current to the horizontal and vertical galvonometers which reduces the area scanned on the solar cell. The voltages plotted by the recorder 34 are kept constant so that the size of the displacement on the recorder is the same. The illusion of perspective can be achieved by adding the sum or difference of output voltage from the electronics 32 to the horizontal input of the recorder 34. This imparts a 45 degree slant to the final tracing plotted by the recorder 34, and enables the magnification of the area scanned up to about 50 times and corresponds to a scan width of about 3 millimeters. The resolution of the apparatus is dependent upon the focussed width of the light beam. FIGS. 3–5 were recorded with a helium neon laser beam focussed to a width of about 0.1 mm.

The total time required for the picture to be traced out depends upon the number of scans chosen. For high detail, about 100 lines per picture are necessary; this requires about 18 minutes to complete a picture. However, acceptable results are achieved with 50 lines per picture which requires about 9 minutes to complete a picture.

Upon illumination of the solar cell 36, one electrode is connected to the lock-in amplifier 40, such as a Princeton Applied Research model 124A, by a wire 37 across a load resistor 38. The load resistor 38 is adjusted so that the voltage at the lock-in amplifier 40 is proportional to the AC current of the solar cell 36. A lock-in amplifier is defined as an AC voltage meter which can accurately measure low-level AC signal amplitudes in the presence of high-level noise. The device compares the input signal from the solar cell 36 with the reference signal from the light source 16 and ignores all signals which are not synchronized with the reference signal.

The other electrode of the solar cell 36 is connected to the recorder 34 by wires 43, 45 and 47 through switches 44 and 46. When the switches 46 and 48 are in the "A" position, the recorder 34 scans the $V_{oc}$ of the solar cell as illustrated by FIG. 3. In the "A" position, the output of the lock-in amplifier 40 is connected to a DC drive amplifier 42 by wire 41. The lock-in amplifier senses the voltage from the photocell 18 corresponding to the AC current created by the illumination of the solar cell 36 with the light source 10 and adjusts the DC drive amplifier 42 so that the AC current created by the solar cell 10 approaches zero. At that point, the voltage plotted by the recorder 34 corresponds to the $V_{oc}$ of the solar cell at the point of the cell illuminated by the light source 10.

FIG. 3 is a trace of the $V_{oc}$ of a dot contact on an amorphous silicon solar cell prepared in accordance with the teachings of Carlson in U.S. Pat. No. 4,064,521 incorporated herein by reference. The variations in the $V_{oc}$ are due to metallization problems of the metal Schottky barrier on the amorphous silicon film. The large hole in the center of the trace corresponds to a thick metal contact pad.

If switches 44 and 46 are in the "B" position and the current on the galvonometers 26 and 28 is kept constant so that the light source 10 irradiates a point on the solar cell 36 and a voltage source 48 is applied to scan the DC voltage of the solar cell and that voltage is connected to the X input of the recorder 34 then the recorder 34 plots the current versus applied voltage at that specific point on the solar cell illuminated by the light source 10 as illustrated by FIG. 4. Two IV curves about 1 cm apart for an amorphous silicon solar cell about 2.9 $cm^2$ are illustrated in FIG. 4. The tracings were made without the necessity of removing those portions of the solar cell to make the specific current versus voltage tracings. The coincidence of the tracings shows a uniform current versus voltage curve at the two points on the solar cell illuminated by the light source 10.

FIG. 5 illustrates a scan of the $I_{sc}$ versus light beam position when the voltage source 48 is adjusted to zero, the switch is set on position "B" as illustrated in FIG. 2, and the mirrors 24 and 28 on the galvonometers 26 and 30 are scanned so that the recorder 34 measures the alternating short circuit current of the solar cell 36. FIG. 5 is a scan of the same solar cell as illustrated in FIG. 3. The variations in the tracings are due to the same metallization problems and the hole in the middle is the thick contact pad of the solar cell. The greater deviation in the short circuit current scan of the solar cell than the corresponding $V_{oc}$ is due to the fact that the open circuit voltage is logarithmically dependent upon light intensity while the short circuit current is linearly dependent upon light intensity.

I wish it to be understood that I do not intend to limit my invention solely to the examples and the graphs described herein but rather it is my intention to include such modifications as would be obvious to the ordinary worker skilled in the art of designing solar cells and measuring the electronic parameters of solar cells.

I claim:

1. An apparatus for automatically determining and recording the open circuit voltage of a solar cell in which the light IV curve crosses the IV curve in the dark, on a point by point basis, said apparatus comprising:
   a light source means for producing a pulse beam of light;
   means for scanning said pulsed beam of light over at least a portion of said solar cell;
   lock-in amplifier means responsive to the output of said solar cell and the timing of said pulsed beam of light for providing an output signal representative of the output from said illuminated portion of said solar cell;
   drive amplifier means responsive to the output of said lock-in amplifier means for applying a bias voltage to a solar cell being tested, said bias voltage being one which is near enough to the open circuit voltage of that portion of the solar cell on which said pulsed beam of light is focussed so that that portion of the solar cell is operating at a quasi open circuit voltage bias level; and
   recording means for recording the quasi open circuit voltage value for at least some of said selected portions of said solar cell.

2. The apparatus according to claim 1 further comprising means for providing said solar cell with a substantially constant bias voltage and for recording the output of said lock-in amplifier which is related to the AC current from said solar cell.

3. The apparatus according to claim 2 wherein said means for scanning said pulsed beam of light over at least a portion of said solar cell is fixed at a spot on the solar cell and said recording means plots the AC current from said solar cell versus an applied DC bias voltage.

4. The apparatus recited in claim 1 or 2 wherein said recording means is capable of providing at least a two dimensional representation of the data and said data is presented as a geometric pattern corresponding to that electronic parameter of the solar cell being measured.

5. The apparatus recited in claim 4 wherein said representation is two dimensional and skewed to represent a perspective view of said solar cell and said parameter is represented in a manner which provides viewing with a three dimensional representation of the parameters versus position where the parameter value is related to the apparent height of the corresponding point above or below the reference plane.

6. The test apparatus recited in claim 4 wherein said recording means provides an XY plot of the data, the X input of the recorder means is the "X" position of the solar cell providing the data minus the "Y" position of that portion and the Y input of the recording means is the "Y" position of the solar cell providing the data plus the data value for that portion whereby a separate data line is drawn from each "Y" position of the scan and the position of the line changes with the changing magnitude of the data.

7. The apparatus according to claim 6 wherein the voltage applied to the Y input of said recording means is a step voltage and the voltage applied to the X input of said recording means is a ramp voltage.

8. The apparatus according to claim 1 wherein said scanning means is divided into a horizontal, X component, and a vertical Y component.

9. The apparatus according to claim 1 wherein the light source is a laser.

10. A method of analyzing the electronic parameters of a solar cell, in which the illuminated IV curve crosses the IV curve in the dark, comprising:
    scanning a coherent light source on a solar cell;
    chopping said coherent light source;
    measuring the component of the AC current created when the chopped light of said coherent light source impinges upon the solar cell; and
    adjusting the DC applied voltage to limit the AC current to zero.

11. The method according to claim 10 further incorporating the step comprising: recording the measured AC component of the current.

12. The method according to claim 11 wherein the AC current is recorded as a function of a fixed DC bias.

13. The method according to claim 10 wherein the DC bias voltage is recorded as a function of position at zero AC current.

14. The method according to claim 12 wherein the recording of the AC current versus applied DC voltage is a function of the IV curve at a specific point.

15. The method according to claim 14 wherein the AC current versus an applied DC voltage is recorded as a function of the scan across a section of the solar cell.

* * * * *